No. 788,974. PATENTED MAY 2, 1905.
W. WEBBER.
HARVESTER FRAME.
APPLICATION FILED JAN. 23, 1905.

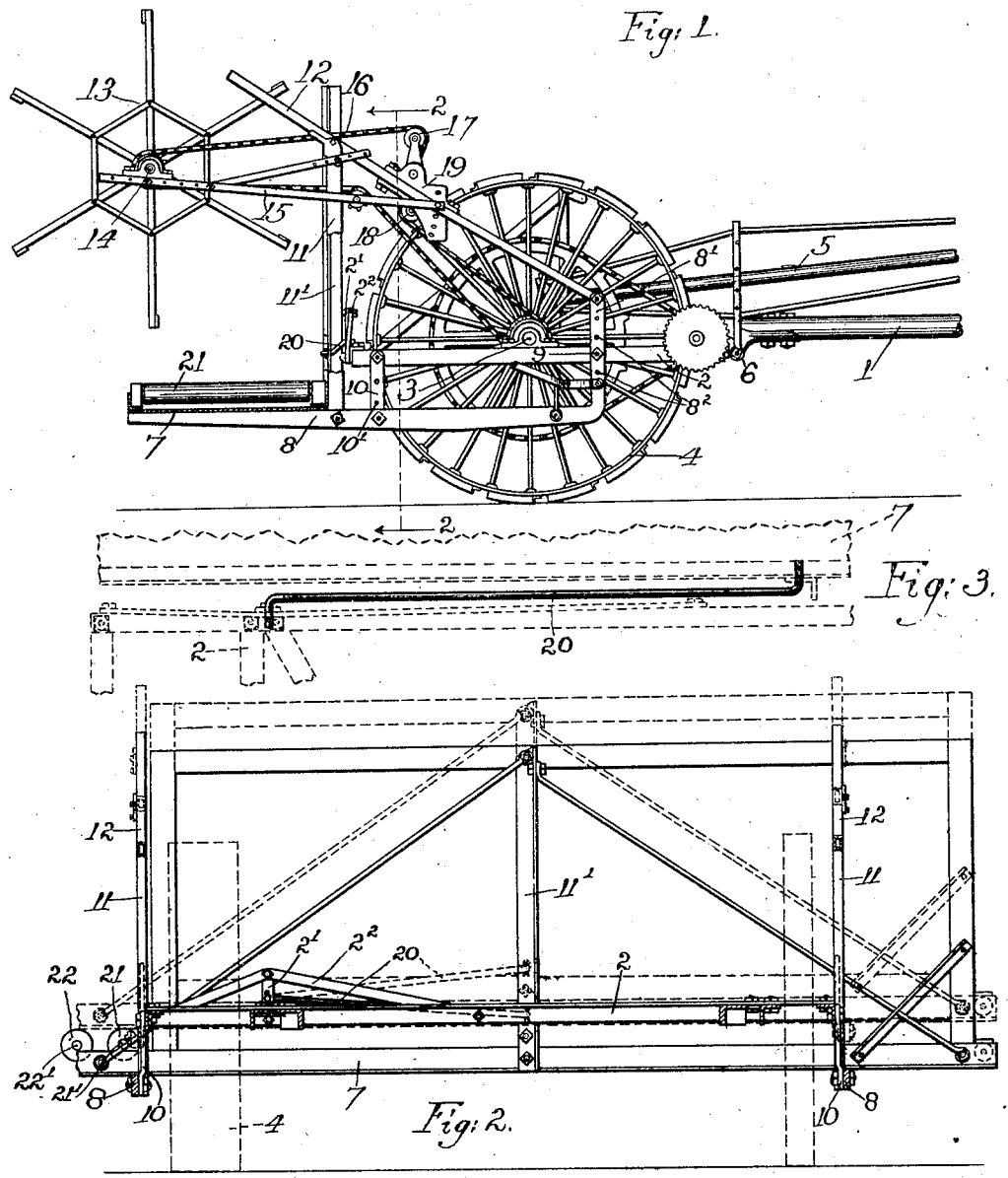

2 SHEETS—SHEET 2.

Witnesses:
J. N. Daggett.
P. H. Alfnds.

Inventor.
William Webber
By J. C. Warnes,
Atty.

No. 788,974. Patented May 2, 1905.

UNITED STATES PATENT OFFICE.

WILLIAM WEBBER, OF CHICAGO, ILLINOIS.

HARVESTER-FRAME.

SPECIFICATION forming part of Letters Patent No. 788,974, dated May 2, 1905.

Application filed January 23, 1905. Serial No. 242,251.

*To all whom it may concern:*

Be it known that I, WILLIAM WEBBER, a citizen of the United States, residing at Chicago, in the county of Cook and State of Illinois, have invented a new and useful Improvement in Harvester-Frames, of which the following is a complete specification.

This invention relates to harvesters of the header type; and it consists in an improved manner of bracing the platform-frame and supporting it in a proper position in relation to the main frame.

The object in view is to so construct and support the platform-frame in relation to the main frame that adjustment of the former can be made without disturbing the securement of any of its parts and to also provide means which will secure the suspended platform against lateral movement when in operation.

Figure 4:
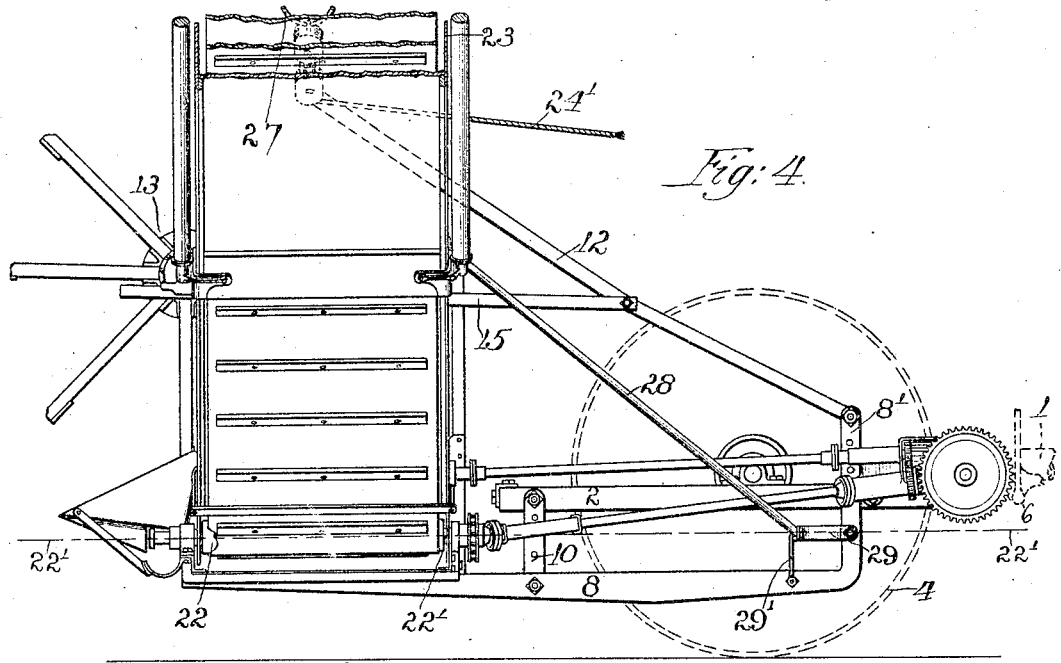
Figure 5:
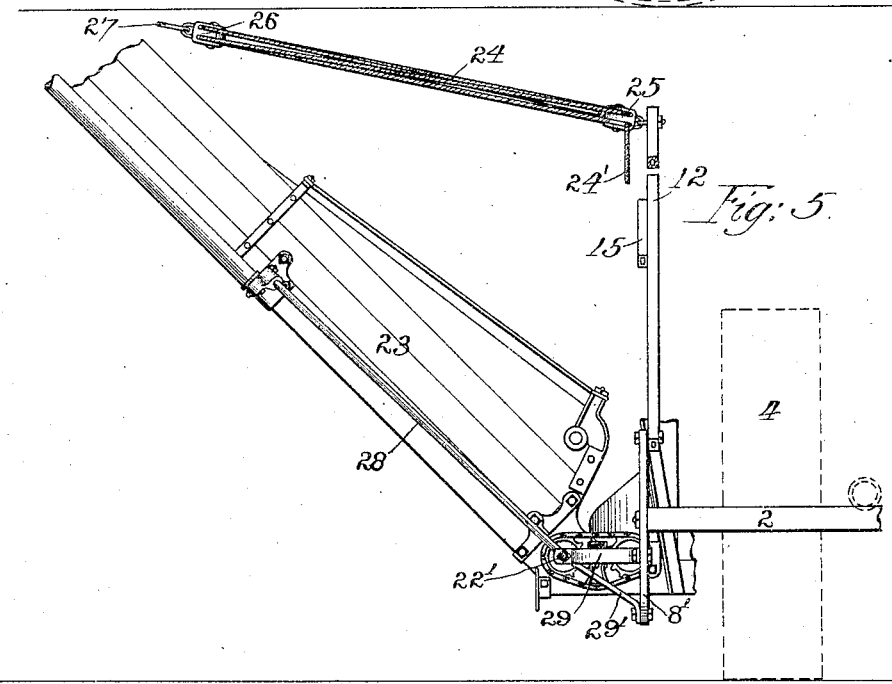

Referring to the accompanying drawings, Figure 1 represents a stubble-side elevation of a portion of a harvester of the header type in which is embodied my invention. Fig. 2 represents a transverse section of the same, taken in front of the axle, as indicated by the line 2 2 in Fig. 1, the dotted lines in this figure showing the platform-frame when adjusted to an elevated position. Fig. 3 is a plan view of the transversely-extending rod which holds the suspended platform-frame relatively rigid laterally with respect to the main frame, the parts of said frames adjacent thereto being shown in dotted lines. Fig. 4 is a stubble-side elevation of the front portion of the machine and designed to show the elevator and the brace-rod for supporting same, while Fig. 5 represents a rear elevation of the elevator and the adjacent portion of the main and platform frames.

The general type of frame construction embodied in the header herein shown consists in a main frame, a platform-frame suspended from the forward side thereof, and a push-pole pivotally connected to the main frame, the pivotal axis thereof lying at the rear of the main frame, while the relation between the push-pole and main frame is controlled by a lever extending rearward to the operator's seat.

In the several figures, 1 designates the push-pole of the machine; 2, a portion of the main frame; 3, the main-wheel axle, and 4 the main supporting-wheel mounted thereon.

5 designates the controlling-lever, and 6 the pivotal axis between the push-pole 1 and the main frame 2, this axis also serving as a support for the said controlling-lever.

Suspended beneath the main frame 2 is the platform-frame 7, the main supporting-levers 8 of which have their rear ends 8' turned upwardly in the rear of the axle 3, as shown in Fig. 1, and secured to the main frame 2 by means of the bolt 9. The series of apertures $8^2$ in the upturned ends 8' of said supporting-levers provide an adjustable connection for the rear end of this lever with the main frame, while the forward end of the supporting-lever is supported upon the forward end of the main frame 2 by means of the links 10. These links 10 are also provided with a series of apertures 10', which make this connection adjustable also.

11 is a vertically-disposed post arranged at each end of the platform-frame 7 and secured to the supporting-levers 8 at its lower end. A brace-bar 12 connects the upper end of this post 11 with the upturned end 8' of the supporting-lever 8.

The reel 13 is slidably arranged in the bearings 14 upon the horizontally-inclined bar 15, this bar connecting with the brace-bar 12 intermediate of the length thereof. The proper tension in the reel-driving chain 16, which is driven from a sprocket-wheel adjacent to the main wheel 4 and around a sprocket-wheel on the reel-shaft, is secured by means of the idler-sprockets 17 and 18, yieldingly mounted on the casting 19, which is secured to the brace-bar 12. Since the bar 12 connects with the upturned end 8' of the supporting-lever 8, adjustment of the platform-frame can be made without affecting the braces or the reel and the driving means therefor. As heretofore constructed the said bar 12 was secured at a point on the main frame 2, thus necessitating a readjustment of same whenever adjustment of the platform-frame was made relative to the main frame. In my construction the platform-frame and reel-support are entirely self-contained, so that relative adjustment between them and the main frame can be made without disturbing any of the component parts thereof.

As the forward end of the platform 7 hangs pendent upon the links 10, it follows that in passing over uneven ground, such as a sidehill or in the ordinary surface irregularities usually encountered incident to cutting, a more or less lateral swinging movement would be given to the platform-frame if the links 10 alone were depended upon to hold it rigid. In order to prevent such lateral movement, a brace-rod 20 is employed. This brace-rod is secured, preferably, to the short truss-post 2' of the truss-rod 2² on the main frame 2, the other end connecting with the centrally-disposed vertical post 11' of the platform-frame 7, as shown in Fig. 2. The arrangement of this rod 20 is such that when the platform-frame occupies a normal position the said rod extends practically horizontally, so that adjustment of the platform-frame will be made an amount substantially equal above and below this central horizontal position. As the rod 20 is of considerable length, the result will be that practically no lateral movement of the platform-frame will result, and yet vertical movement thereof will be permitted.

In a manner similar to that in which the reel-frame is braced a brace-rod is also applied to the grain-elevator, as set forth in Figs. 4 and 5. The numerals 21 and 22 designate, respectively, the stubbleward roller of the platform and the lower roller of the elevator-frame, the rollers having their respective axes or centers at 21' and 22'. Pivoted coincident with the axis of the roller 22 is the elevator-frame 23, the upper or free end of which is sustained and controlled in its position by means of the rope connection 24, which engages the sheave 25 on the upper end of the brace-bar 12 and the sheave 26 on the bail 27. The bail 27 is hinged to the upper end of the elevator 23, and as the upper end of the elevator is shown broken away only a fragment of the bail appears. One strand 24' of the rope 24 extends rearwardly and connects with suitable levers within reach of the operator. Secured to the rear side of the elevator-frame 23 is the brace-rod 28, which extends downward, inwardly, and rearward to the brace-rod supports 29 and 29', to which it pivotally connects. These brace-rod supports 29 and 29' are secured to the rear end of the stubbleward platform-supporting bar 8 and extend outwardly far enough to bring the axis of their pivotal connection in alinement with the pivotal axis of the elevator-frame 23 with the platform-frame, which is the axis 22' of the roller 22. Since the axis 22' of the roller 22 extends longitudinally of the machine, it follows that the pivotal connection of the brace-rod 28 with the platform-frame will be longitudinally coincident with the pivotal axis of the elevator-frame. This will permit of adjustment of either the elevator-frame or the platform-frame to be made without affecting the brace-bar in its proper relation to the connected parts.

What I claim as my invention, and desire to secure by Letters Patent, is—

1. In combination with the main frame of a harvester, a platform-frame in front thereof, supporting-levers in connection with said platform-frame whereby it is adjustably supported on the main frame, the rear ends of which levers extend upwardly, a reel-supporting frame extending upwardly from the platform-frame, a reel mounted thereon, and brace-bars extending from the upper portion of said reel-frame to the upturned ends of the platform-supporting levers.

2. In combination with the main frame of a harvester, a platform-frame in front thereof, supporting-levers in connection with said platform-frame whereby it is adjustably supported on the main frame, the rear ends of which levers extend upwardly, a reel-supporting frame extending upwardly from the platform-frame, a reel mounted thereon, brace-bars extending from the upper portion of said reel-frame to the upturned ends of the platform-supporting levers, and a reel-chain-tension device located on the stubbleward brace-bar.

3. In combination with the main frame of a harvester, a platform-frame adjustably suspended from said main frame and in front thereof, and a horizontally-extending rod pivotally connected to and interposed between the said main frame and platform-frame whereby the latter frame is held relatively rigid laterally with respect to the main frame.

4. In combination with the main frame of a harvester, a platform-frame adjustably suspended in front of said main frame, an elevator-frame pivotally connected at its lower end to the stubbleward side of the platform-frame, means for controlling the position of the free or upper end thereof, and a brace-rod secured to said elevator-frame and pivotally connected to the platform-frame at a point in alinement with the pivotal axis of the elevator-frame.

5. In combination with the main frame of a harvester, a platform-frame adjustably suspended in front of said main frame, an elevator-frame having a pivotal connection at its lower end with the stubbleward side of the platform-frame, the axis of the pivotal connection extending longitudinally, means for controlling the free or upper end of the elevator-frame, a brace-rod support secured to and extending stubbleward from the platform-frame, and a brace-rod fastened to the elevator-frame and extending downward, inwardly and rearward to the brace-rod support, to which it pivotally connects at a point longitudinally coincident with the axis of the pivotal connection between the elevator-frame and platform-frame.

WILLIAM WEBBER.

Witnesses:
G. W. HENDERSON,
J. C. WARNES.